Figure 1:
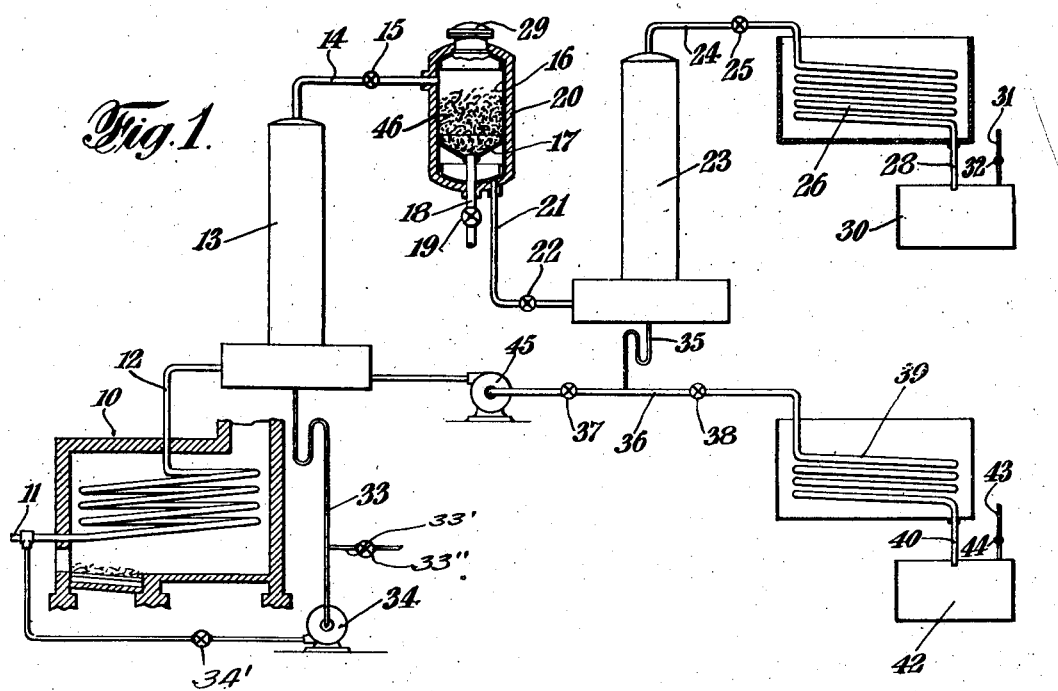

May 20, 1930. T. T. GRAY 1,759,814
REFINING OF HYDROCARBONS
Filed Aug. 9, 1926 3 Sheets-Sheet 1

Inventor
Thomas T Gray
By his Attorneys Kenyon & Kenyon

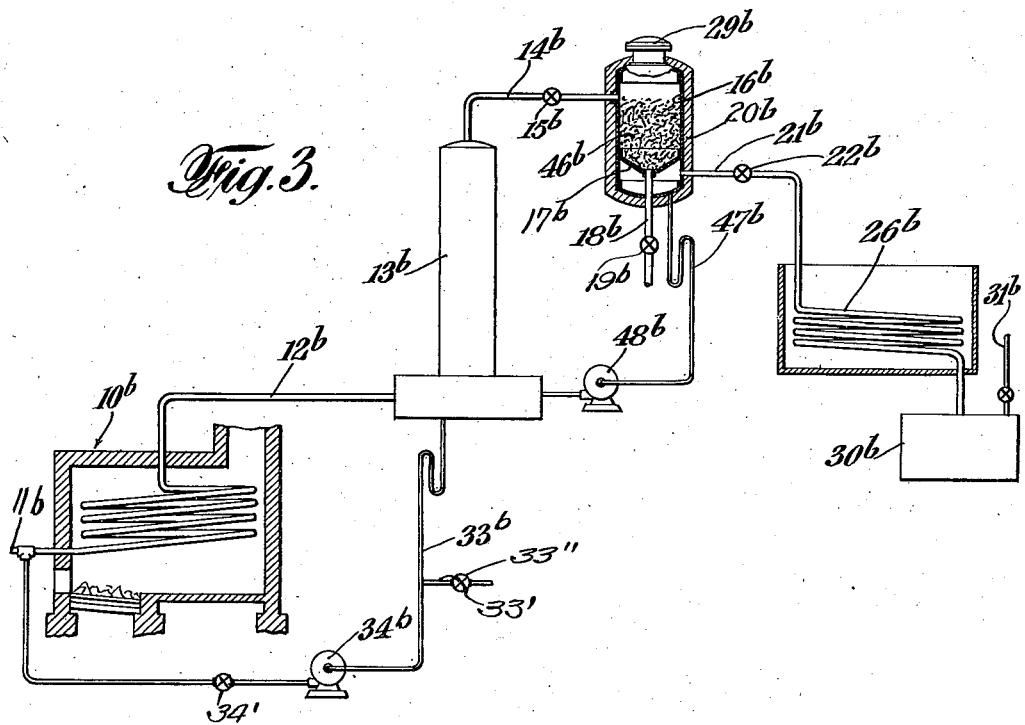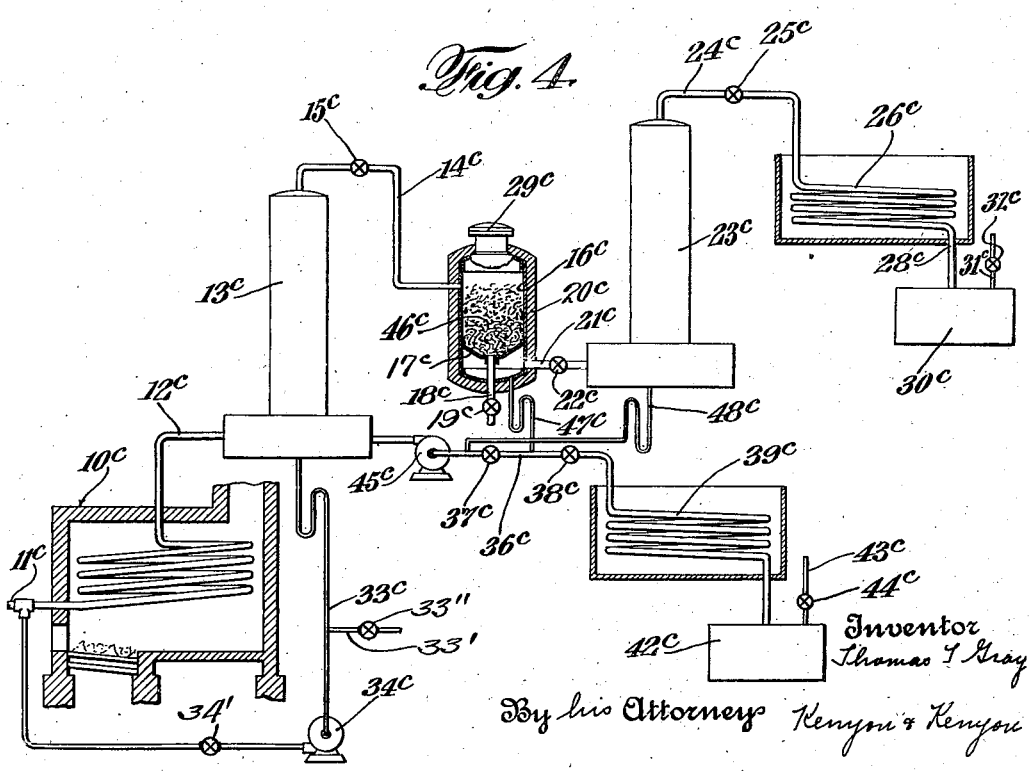

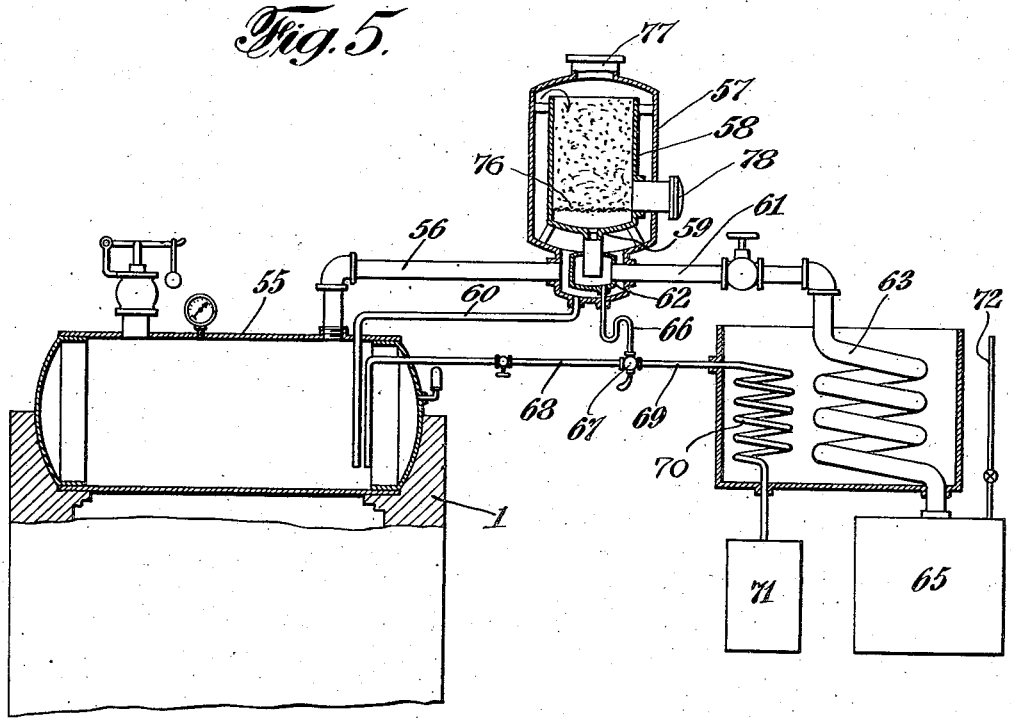

Patented May 20, 1930

1,759,814

UNITED STATES PATENT OFFICE

THOMAS T. GRAY, OF ELIZABETH, NEW JERSEY, ASSIGNOR TO GRAY PROCESSES CORPORATION, OF NEWARK, NEW JERSEY, A CORPORATION OF DELAWARE

REFINING OF HYDROCARBONS

Application filed August 9, 1926. Serial No. 128,007.

This invention relates to the refining of hydrocarbons and more especially to the refining of distillates obtained by cracking petroleum or the like.

Cracked distillates contain unsaturated hydrocarbon compounds not present in the oil from which the distillate was obtained. Certain of the hydrocarbon compounds are very unstable and possess the property of combining between themselves to form new compounds of considerably higher boiling point. The new compounds are known as polymers and the formation thereof is called polymerization. Under ordinary circumstances polymerization takes place slowly. It effects discoloration of the liquid and forms compounds which will in time produce a deposit of heavy dark solid or semi-solid material. The unstable unsaturated hydrocarbons are objectionable because of their tendency to cause gum deposition on valves, pistons, and the parts of gasoline motors. They are also undesirable constituents of burning oils. Before cracked hydrocarbon distillates are ready for the market, some treatment is necessary to remove therefrom the undesirable unsaturated hydrocarbon compounds.

Applicant has discovered that these undesirable compounds may be quickly converted into liquid polymers by contacting cracked distillate in vaporous condition with a suitable catalytic agent and has disclosed this method in his Patent No. 1,340,889. Applicant's co-pending application Serial No. 664,893, filed Sept. 26, 1923, of which this application is a continuation in part, is directed in part to the utilization of heat in the vapor to maintain the catalyst at a temperature which will prevent excessive condensation of the desired product in the catalyst and to the broad idea of continuous removal of polymers during the operation of the process as well as to conditioning the vapors for treatment by the removal of high boiling point constituents therefrom prior to contacting the vapors with the catalyst.

When fresh, the catalyst is very efficient in polymerizing the unsaturated hydrocarbon compounds and the product obtained from the process is of high quality. However, after a period of use the catalyst loses its effectiveness and eventually has to be renewed to obtain a satisfactory product.

An object of this invention is so to subject the distillate in vapor form to the catalyst material that the efficiency of the catalyst material used in the polymerizing operation is increased whereby a greater yield of treated product is obtainable with a given amount of catalyst material.

According to this invention, the distillate may be fractionated by means of any suitable fractionating device or bubble tower before being contacted with the catalyst so that only the desired fraction, which may be gasoline of definite boiling range, is treated or the distillate may be partially fractionated before polymerization and the fractionation completed after polymerization to produce the desired product. When a bubble tower is used as the fractionating device, the product obtained is a fraction having a definite boiling range and may be gasoline. The cracked distillate is thus rid of the undesirable high boiling point constituents, which, unless removed, may have a tendency to shorten the useful life of the treating material. The vapor is supplied to the treating material from the fractionating device at uniform pressure and temperature, thereby minimizing operational supervision of the apparatus. Since the temperature is uniform, no heat is lost from the vapor after the treating material has been brought up to vapor temperature except by radiation. The low and high boiling point constituents of the fraction having a definite boiling range which may be gasoline pass through the treating material together and the higher boiling point constituents which are the harder to treat are diluted with the more easily treated lower boiling constituents. Since the vapor is supplied to the treating tower directly from the fractionator, the uncondensible gases normally present in cracked distillate serve to dilute the fraction, thereby rendering it easier of treatment than if not so diluted. As the temperature of the vapor supplied to the treating material is uniform, there is substantially no difference between the temperature of the vapor and of the treating material after the device is in operation, and there is less condensation in the treating material of the less volatile portions. With this arrangement, a higher yield of stable product is obtainable for a given amount of treating material than heretofore.

The treated vapor and the liquid products, comprising polymers together with whatever condensate has formed in or above the catalyst are withdrawn either together or separately after contact with the catalyst. The catalyst is thus kept continuously in proper condition to be contacted by the vapor. If the treated vapor and polymers are withdrawn together they may be subsequently separated in any suitable manner. The polymers and accompanying liquids may be refluxed into the system for redistillation or may be stored for subsequent treatment. The vapor is condensed and the condensate collected to be utilized as desired.

Applicant has discovered that in certain if not all instances, the efficiency of the treating material is materially increased by contacting the vapor therewith under a pressure considerably in excess of atmospheric. The treating material has a longer effective life when the vapor is contacted therewith at super-atmospheric pressure than when contacted therewith at atmospheric pressure. Also the yield of treated product for a given quantity of treating material is materially increased when the vapor is contacted with the treating material under pressure.

The desirable low-boiling compounds which would have been removed in the acid treatment, commonly employed before my invention, are not removed during treatment in accordance with my invention but appear in the condensate of the vapors. My invention accordingly results in selective polymerization by removing the objectionable or unstable unsaturates without affecting the unobjectionable constituents of the vapors.

Other objects, novel features and advantages of the invention will be apparent from the following specification and accompanying drawings, wherein Figures 1, 2, 3, 4 and 5 disclose different forms of apparatus for refining hydrocarbons in accordance with the invention.

Referring now to Fig. 1, 10 represents a pressure still of the tube type to which oil to be cracked or, in the case of a rerun operation, previously cracked oil from a distinct cracking unit is supplied through the pipe 11 from a source not shown. The outlet 12 from the still leads to a fractionating device 13 which is of any suitable type to fractionate the distillate to the desired extent. A pipe 14 controlled by a valve 15 connects the fractionator 13 with a treating tower 16. Within the tower 16 is provided a perforated funnel-like shelf 17 from the bottom of which a discharge spout 18 controlled by a valve 19 leads through the bottom of the tower. A layer of heat insulating material 20 preferably surrounds the tower 16. From the bottom of the tower 16 a pipe 21 controlled by a valve 22 leads to a second fractionator 23. This fractionator is of suitable design further to fractionate the treated distillate to yield the desired fraction, which may be gasoline. A pipe 24 controlled by a valve 25 connects the fractionator 23 with a condenser 26. The outlet of the condenser 26 communicates with a pipe 28 leading to a tank 30 which is provided with a vent 31 controlled by the valve 32. A reflux pipe 33 leads from the fractionating tower 13 to the supply pipe 11 for the still 10 and a pump 34 is provided for supplying the pressure necessary to force the reflux into the supply pipe. A discharge pipe 35 leads from the bottom of the fractionating device 23 and communicates with a pipe 36 equipped with valves 37 and 38 arranged at either side of the connection between the pipe 35 and the pipe 36. From the valve 38 the pipe 36 leads to a cooler 39 which in turn communicates through a pipe 40 with a tank 42 having a vent 43 controlled by a valve 44. Through the valve 37 and the pump 45 the pipe 36 communicates with the bottom of the fractionating device 13.

The shelf 17 supports within the tower 16 a body 46 of treating material or catalytic agent such, for example, as fuller's earth, bauxite, silica gel or other adsorbent material which is capable of polymerizing unstable unsaturated hydrocarbon compounds in cracked distillate to form compounds of higher boiling point than the temperature of the vapor treated. The treating agent is prevented from sifting through the perforations in the shelf 17 either by means of screens or layers of mineral wool or similar substances laid upon the shelf. After the catalyst has become spent it may be removed by being drained out through the spout 18.

In the operation of this apparatus the tower 16 is first charged with treating material through a manhole 29 at the top of the tower and then oil to be cracked or a cracked distillate from a separate cracking unit is admitted to the still through the pipe 11. The vaporized distillate flows through the pipe 12 and into the fractionator 13 where it is partially fractionated. The condensate which may contain some of the desired product is refluxed through the pipe 33 and pump 34 to the still and the vapor led through the pipe 14 and valve 15 to the tower 16. Here the vapor passes through the treating material which is maintained substantially at the temperature of the vapor as radiation losses are substantially prevented by the layer of insulating material. In their passage through the treating material the unstable unsaturated hydrocarbons present in the vapors are polymerized into compounds of higher boiling point than the temperature of the vapors, the polymers thus formed being soluble in gasoline. These compounds or polymers condense, gradually flow through the catalyst and drip through the perforations in the shelf 17 accompanied by any liquids resulting from condensation in the catalyst. They are thus continuously withdrawn from the catalyst, leaving it in proper condition to be contacted with fresh vapor. The liquid products and treated vapor are conducted through the pipe 21 and the valve 22 to the fractionator 23 where the liquid products are separated from the treated vapor and the latter is further fractionated to obtain the desired product which may be gasoline of definite boiling range. This product in vapor form is led off through the pipe 24 and valve 25, to the condenser 26 from whence, after condensation, it flows to the tank 30. Permanent gases may be allowed to escape from the product in the tank 30 through the vent pipe 31. The liquid products including the polymers drain out through the pipe 35 into the pipe 36. By closing the valve 37 and opening the valve 38, the liquid may be led to the cooler 39 and from thence to the tank 42. By closing the valve 38 and opening the valve 37 the liquid may be returned to the bottom of the fractionating device 13 from whence it is refluxed into the system through the pipe 33 and pump 34.

To utilize applicant's discovery that a greater efficiency of treating material is obtained by contacting the treating material with vapor under a pressure considerably in excess of atmospheric, the temperature of the still 10 may be regulated and the valves 15, 22, 25 and 32 manipulated properly to bring the vapor into contact with the treating material at any desired pressure. The pressure may be selected at which it has been found the treating material is most effective. The effective life of the treating material is materially increased by an increase in pressure in the vapor and a corresponding increase of yield is obtained in the treated product for a given amount of treating material. By means of the valves a pressure differential may be obtained in different parts of the system and may be regulated as desired. By proper regulation of the valves the vapor may be brought into contact with the treating material at atmospheric pressure, if desired.

Figure 2:
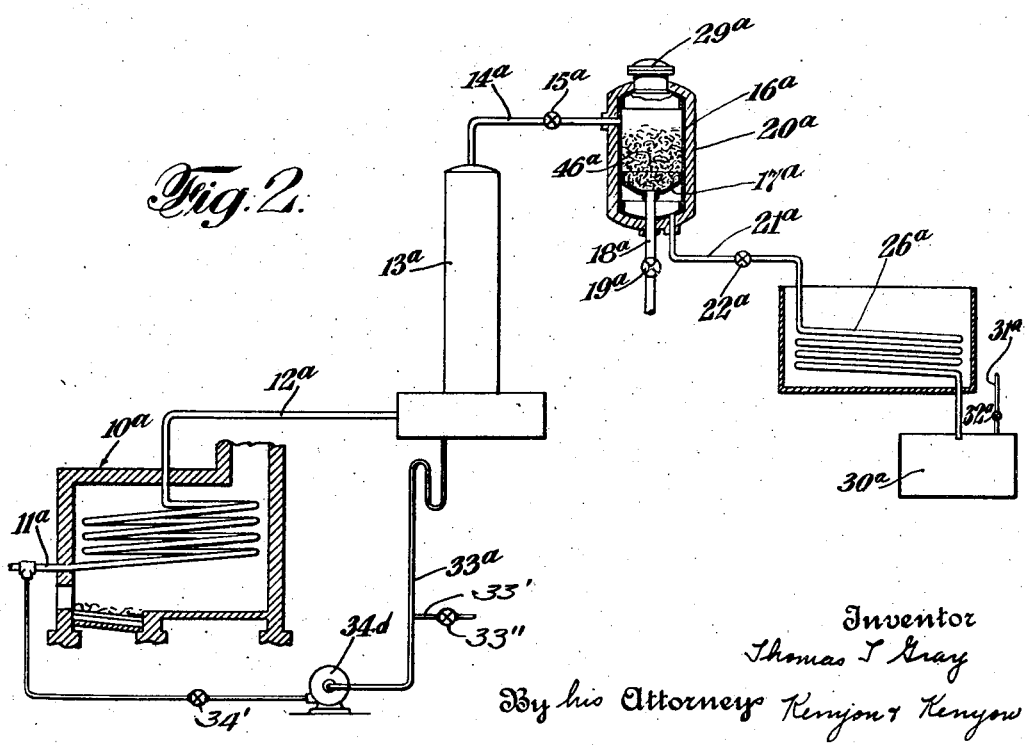

Referring now to Fig. 2, $10^a$ is the still from which the vapors are led through the pipe $12^a$ to the fractionator $13^a$. From the fractionating tower $13^a$ the vapor is conducted through the pipe $14^a$ and valve $15^a$ to the treating tower $16^a$ in which is arranged a perforated conical shelf $17^a$ terminating in a discharge spout $18^a$ controlled by valve $19^a$. A discharge pipe $21^a$ controlled by valve $22^a$ leads from the bottom of the tower $16^a$ to a condenser $26^a$. The outlet from the condenser leads to a storage tank $30^a$ having a vent $31^a$ controlled by the valve $32^a$. A reflux pipe $33^a$ leads from the fractionator $13^a$ through the pump $34^a$ to the supply pipe $11^a$ for the still $10^a$. A layer of insulation $20^a$ surrounds the treating tower $16^a$ and within the tower is provided the body of treating material $46^a$.

The operation of this apparatus is similar to that of Fig. 1 except that the liquid product and treated vapors are both led into the condenser $26^a$ and the condensate including polymers and treated product is collected in the tank $30^a$ for further treatment, such as re-run distillation. Preferably the fractionator $13^a$ is one capable of yieldingly a fraction having a definite boiling range which fraction may be gasoline. The vapor may be contacted with the treating material under pressure, any desired pressure being obtainable by regulation of the temperature in the still and manipulation of the valves $15^a$, $22^a$ and $32^a$.

In Fig. 3, $10^b$ is the still, $12^b$ the pipe leading from the still to the fractionating tower $13^b$ and $14^b$ is the pipe controlled by the valve $15^b$ leading to the treating tower $16^b$. $17^b$ is the perforated shelf and $18^b$ the discharge spout controlled by valve $19^b$. The pipe $21^b$ controlled by the valve $22^b$ leads to a condenser $26^b$ which in turn leads to a tank $30^b$. A reflux pipe $47^b$ leads from the bottom of the treating tower $16^b$ through a pump $48^b$ to the bottom of the fractionator $13^b$. A layer of insulating material $20^b$ surrounds the tower $16^b$ and a supply of treating material $46^b$ is supported on the shelf $17^b$. In this apparatus the treated vapor is withdrawn from the tower $16^b$ through the pipe $21^b$ and valve $22^b$ to the condenser $26^b$ where it is liquefied and then discharged into the storage tank $30^b$. The polymers and any condensate are separately removed from the treating tower $16^b$ through the reflux pipe $47^b$ and are discharged into the bottom of the fractionator $13^b$ from whence they are refluxed through the pipe $33^b$ and pump $34^b$ to the feed line $11^b$ of the still $10^b$. By means of the fractionator $13^b$, a fraction of definite boiling range, which may be gasoline, is obtained and is brought into contact with the treating material at any desired pressure by regulation of the temperature of the still $10^b$ and manipulation of the valves $15^b$ and $22^b$.

Referring now to Fig. 4, $10^c$ is the still, $12^c$ the pipe leading from the still to the fractionating tower $13^c$. $14^c$ is the pipe controlled by the valve $15^c$ leading from the fractionator $13^c$ to the tower $16^c$ in which is provided a perforated conical shelf $17^c$ terminating in a discharge spout $18^c$ controlled by valve $19^c$. Within the tower $16^c$ a supply of treating material $46^c$ is supported upon the shelf $17^c$ and a layer of insulating material $20^c$ surrounds the tower. $21^c$ is a vapor discharge pipe controlled by the valve 22ᶜ leading to the fractionator 23ᶜ. From the top of the fractionator 23ᶜ a pipe 24ᶜ controlled by valve 25ᶜ leads to a condenser 26ᶜ and from the condenser a pipe 28ᶜ leads to a tank 30ᶜ having a vent pipe 31ᶜ controlled by valve 32ᶜ. A discharge pipe 47ᶜ for liquid products leads from the bottom of the tower 16ᶜ to a pipe 36ᶜ equipped with valves 37ᶜ and 38ᶜ. Through the valve 38ᶜ the pipe 36ᶜ communicates with a cooler 39ᶜ which in turn communicates with a tank 42ᶜ. Through the valve 37ᶜ and pump 45ᶜ the pipe 36ᶜ communicates with the bottom of the fractionator 13ᶜ from which a reflux pipe 33ᶜ leads through the pump 34ᶜ to the supply line 11ᶜ for the still 10ᶜ. A reflux pipe 48ᶜ leads from the bottom of the fractionator 23ᶜ to the pipe 36ᶜ between the valve 37ᶜ and pump 45ᶜ. In this apparatus cracked distillate from the still 10ᶜ is partially fractionated and brought into contact with the catalytic agent 46ᶜ and polymerized. The treated vapor and liquid products are separately withdrawn from the tower 16ᶜ. The vapors are passed through the fractionator 23ᶜ where they may be further fractionated and from there to the condenser 26ᶜ. The condensate collecting in the fractionator 23ᶜ may be refluxed into the system for redistillation. The liquid product from the tower 16ᶜ including the polymers may either be collected in the tank 42ᶜ by being run through the cooler 39ᶜ or may be fed back through the fractionator 13ᶜ to the still 10ᶜ for further re-distillation. The pressure of the vapor contacting with the treating material may be regulated by controlling the temperature of the still and by proper operation of the valves 15ᶜ and 22ᶜ.

In the various forms of apparatus disclosed in Figs. 1 to 4 inclusive, a valve 34' is provided in the reflux line between the pump and the connection between the reflux line and the feed pipe. Also in each of these forms of apparatus a pipe 33″ controlled by valve 33″ leads from the reflux pipe and provides means to permit removal of unvaporized residue from the system.

Referring now to Fig. 5, the pressure still 55 set in brick work is heated by fire or otherwise in the usual manner. It is connected by a vapor line 56 to a point near the bottom of the fractionating tower 57. Within the fractionator is mounted a container 58 which is open at the top, thereby communicating with the interior of the fractionator and is provided at its bottom with a restricted neck portion 59 which communicates with a separating chamber 62 mounted within the lower portion of the fractionator. A return line 60 leads from the foot of the fractionator to the still 55. A second vapor line 61 leads from a point above the bottom of a separating chamber 62 to a condenser 63 and storage tank 65. A pipe 66 leads from the foot of the chamber 62 to a three-way valve 67, one connection 68 from which leads back to the still and the other connection 69 to a cooler 70 and tank 71. A vent pipe 72 from the tank 65 is provided for separating the fixed gases from the condensate. Valves are provided for the pipes 61, 68, 69 and 72. Within the container 58 is provided a body of treating material which is supported upon a perforated partition 76 just above the neck 59 and over which is placed a layer of mineral wool or the like to prevent the treating material falling through the perforations. Manholes 77 and 78 are provided for charging and cleaning the container 58. In the operation of this apparatus the oil to be cracked or a previously cracked oil is charged into the still 55. The oil is heated and distilled under any desired pressure by regulation of the valve in the pipe 61. The vaporized cracked products enter the fractionator 57 through the pipe 56 and come in contact with and impart heat to the treating material container 58 and to material contained therein. The liquids entrained in the vapors and the heavier portions of the vapors which are condensed in the fractionator return to the still through the pipe 60. The vapors pass up and around the container 58 and enter it at the top, passing down through the treating material and through the partition 76 and neck 59 into the separating chamber 62 and thence by pipe 61 to the condenser 63. The treating material is thus heated by the vapors before being contacted by the same. The fixed gases go off by pipe 72 and the finished product is collected in liquid form in the tank 65. After a period of operation the treating material in the container 58 commences to be wetted at the top due to the formation there of polymers of higher boiling point than the temperature of the entering vapors. This wetness increases progressively downwards towards the bottom of the treating material as the distillation continues until the polymers pass with the vapors through the neck 59 into the chamber 62. The polymers and other liquids flow out through the chamber 62 to the pipe 66. If it is desired to collect the polymers, the three-way valve 67 may be set to lead them into the pipe 69 and to the tank 71. Otherwise they may be returned to the still 55 by the pipe 68. Here again the polymers are continuously drained off from the treating material so that it is continuously in proper condition to be contacted with by fresh vapor. The vapor may be brought into contact with the treating material at any desired pressure by regulating the temperature in the still 55 and regulating the valve in the pipe 61.

In each form of apparatus described herein the temperature of the treating material is maintained substantially at the temperature of the vapor to be treated so that excessive condensation is prevented during the treating operation. In the modifications disclosed in Figs. 1 to 4 inclusive the layer of insulating material surrounding the treating tower prevents loss of heat by radiation and passage of the vapor through the treating material heats it substantially to the temperature of the vapor. In Fig. 5 the vapor is brought into heat exchange relation to the treating material before being brought into actual contact therewith. The boiling point of the polymers formed by the action of the treating material on the unstable unsaturated hydrocarbons in the vapor is higher than the temperature of the vapors so that upon their formation they condense into liquid form. Polymers drain through the catalytic material and drip into the bottom of the tower from which they are continuously drained off, thereby effecting continuous separation of the polymers from the vapors. By reference in the claims to the removal of polymers from the vicinity of the treating zone, I mean removal of polymers from the treating tower. The catalytic material is thus continuously kept in condition to be contacted with fresh vapor. In each instance advantage may be taken of the applicant's discovery that the efficiency of the catalytic material is increased when the vapor to be treated is supplied thereto under pressure in excess of atmospheric. By virtue of this discovery, a greater amount of vapor can be treated with a given amount of catalyst.

Although applicant's invention has been disclosed in connection with pressure type cracking units it is not limited to such use. When the invention is used in connection with atmospheric pressure type cracking stills, vapor phase cracking stills or in a re-run distillation, the vapor may be compressed by any suitable means before being brought into contact with the catalyst. Whether or not the vapor is subjected to the action of the catalytic material under pressure the polymers are continuously removed from the treating material, thereby maintaining it in proper condition to be contacted by fresh vapor. It is, of course, apparent that if it is desired to work with the vapor under a higher pressure than the cracking unit or still available is designed to operate at, a compressor may be installed in the system intermediate the cracking unit and treating tower. Extremely good results have been obtained by operating under pressures lying between 25 and 200 lbs. per square inch.

This process is of particular utility in the production of motor fuel such as gasoline. Cracked distillate treated according to the method described to remove therefrom the unsaturated unstable hydrocarbons yields a high quality gasoline which is immediately available for use in internal combustion engines, except in cases where the cracked products originally contain high amounts of sulphur compounds, in which case it may be desirable to further refine them before, during, or after the treatment herein disclosed.

Where oils are cracked primarily to produce gas the gas may contain as impurities objectionable polymerizable hydrocarbons. In such cases the said objectionable constituents can be removed by polymerization in a manner similar to the one herein set forth. The treated vapors would not be condensed but would be led to a storage tank. The polymerized material may be refluxed to the system or may be collected separately.

By the words "solid adsorptive material", "solid adsorptive catalyst" and "adsorptive catalytic material" as used in the appended claims, I intend to include only materials of that class which are capable of selectively polymerizing objectionable unstable, unsaturated constituents of cracked hydrocarbon vapor which tend to discolor one exposure to light and to form deposits.

What I claim as new and desire to secure by Letters Patent of the United States is:

1. The method of obtaining substantially color stable motor fuel, which comprises cracking a hydrocarbon oil, subjecting the resulting cracked vapors to partial condensation to obtain a vapor fraction having a definite boiling range, contacting the fraction thus obtained while still in vapor phase with solid adsorptive material thereby polymerizing the constituents of the fraction which tend to discolor on exposure to light and to form deposits, continuously draining from said adsorptive material and withdrawing from the vicinity of the treating zone polymers formed in said material, and continuously removing the treated fraction from said adsorptive material.

2. The method of obtaining substantially color stable motor fuel, which comprises cracking a hydrocarbon oil, obtaining from the cracked distillate a fraction having a definite boiling range, contacting said fraction in vapor phase at super-atmospheric pressure with solid adsorptive material thereby polymerizing the constituents of the fraction which tend to discolor on exposure to light and to form deposits, continuously draining from said adsorptive material and removing from the vicinity of the treating zone polymers formed in said material and removing the treated fraction from the adsorptive material.

3. The method of producing motor fuel that will not readily polymerize through the ordinary action of light and air, from hydrocarbon vapors containing unstable, unsaturated compounds, which consists in obtaining from the hydrocarbon vapors by partial condensation a vapor fraction having a definite boiling range, passing the fraction while still in vapor phase into contact with a solid adsorptive catalyst thereby polymerizing the constituents of the fraction which tend to discolor on exposure to light and to form deposits, continuously draining from said adsorptive material and withdrawing from the vicinity of the treating zone polymers formed in said adsorptive material, and continuously removing the treated fraction from the adsorptive material.

4. The method of obtaining substantially color stable motor fuel which comprises cracking a hydrocarbon oil, subjecting the resulting cracked vapors to partial condensation to obtain a vapor fraction having a definite boiling range, contacting the fraction thus obtained while still in vapor phase with solid adsorptive catalytic material to effect polymerization of the constituents of the fraction which tend to discolor on exposure to light and to form deposits, and continuously draining from said adsorptive material and withdrawing from the vicinity of the treating zone polymers formed in said material.

5. The method of obtaining substantially color stable motor fuel, which comprises cracking a hydrocarbon oil, obtaining from the cracked distillate and in vapor phase a fraction having a definite boiling range, maintaining said fraction in vapor phase and bringing it into contact with solid adsorptive material at super-atmospheric pressure to effect polymerization of the constituents of the fraction which tend to discolor on exposure to light and to form deposits, effecting condensation in the adsorptive material of the polymers thus formed, continuously draining from said adsorptive material and withdrawing from the vicinity of the treating zone polymers formed in said material, and continuously removing the treated fraction from said adsorptive material.

6. The method of obtaining substantially color stable motor fuel which comprises cracking a hydrocarbon oil, obtaining from the cracked distillate and in vapor phase a fraction having a definite boiling range, maintaining said fraction in vapor phase and bringing it into contact with solid adsorptive material at super-atmospheric pressure to effect polymerization of the constituents of the fraction which tend to discolor on exposure to light and to form deposits, and continuously draining from and removing from the vicinity of the treating zone polymers thus formed therein.

7. The process of producing substantially color stable gasoline, which comprises cracking a hydrocarbon oil, subjecting the resulting cracked vapors to partial condensation to obtain a vapor fraction in the gasoline boiling range, contacting the fraction thus obtained while still in vapor phase with solid absorptive material to effect polymerization of the constituents of the fraction which tend to discolor on exposure to light and to form deposits, effecting separation of the treated fraction and polymers by condensation of the latter, and continuously draining from said adsorptive material and removing from the vicinity of the treating zone polymers formed in said material.

8. The process of obtaining substantially color stable motor fuel from cracking still vapors, which comprises subjecting said vapors to partial condensation to obtain a fraction having a definite boiling range, subjecting said fraction while still in vapor phase to the action of solid absorptive material to effect polymerization of the constituents of the fraction which tend to discolor on exposure to light and to form deposits, separating the treated fraction from the polymers thus formed by condensation of the latter, and continuously draining from the solid adsorptive material and removing from the vicinity of the treating zone liquid polymers formed in the material.

9. The method of obtaining substantially color stable motor fuel which comprises cracking a hydrocarbon oil, fractionating the cracked distillate, passing the fraction thus obtained in vapor phase through solid adsorptive material to effect polymerization of the constituents of the fraction which tend to discolor on exposure to light and to form deposits, continuously removing polymers from said material and from the vicinity of the treating zone continuously withdrawing treated vapor from said adsorptive material and separating the same from the polymers, and subsequently fractionating the treated vapor to obtain motor fuel having a definite boiling range.

10. The process of producing from cracked distillate motor fuel relatively free from gum forming constituents and compounds unstable to light, which comprises vaporizing said distillate, subjecting the vaporized distillate to a fractionating step to remove therefrom the portion lying outside the boiling range of gasoline, passing the remaining vapor through a body of solid adsorptive material thereby effecting polymerization of the gum forming constituents and compounds unstable to light, continuously withdrawing polymers from the adsorptive material and from the vicinity of the treating zone, continuously removing treated vapors and separating the same from the polymers, removing from the treated vapor constituents lying outside the desired boiling range and finally condensing the remaining vapor.

11. The process of treating cracked distillate for the purpose of producing therefrom motor fuel relatively free from gum forming constituents and compounds unstable to light, which comprises vaporizing cracked distillate, subjecting the vaporized distillate to the fractionating step to remove therefrom the portion lying outside the boiling range of gasoline, passing the remaining vapor through a bed of solid adsorptive material and maintaining the vapor at superatmospheric pressure, thereby effecting polymerization of the gum forming constituents and compounds unstable to light, continuously withdrawing polymers from the adsorptive material and from the vicinity of the treating zone, continuously removing the treated vapor and separating the same from the polymers, removing from the treated vapor constituents lying outside the desired boiling range and finally condensing the remaining vapor.

12. The process of producing substantially color stable motor fuel from heavy hydrocarbons, which comprises subjecting said hydrocarbons to cracking conditions, removing from the evolved vapor, by partial condensation, hydrocarbons lying outside the gasoline boiling range, passing the remaining vapor through a body of solid adsorptive material, thereby effecting polymerization of the constituents of such vapor which tend to discolor on exposure to light and to form deposits, continuously withdrawing polymers from the adsorptive material and from the vicinity of the treating zone, continuously removing the treated vapor from said adsorptive material and separating it from the polymers, removing from the treated vapor constituents lying outside the desired boiling range and finally condensing the remaining vapor.

13. The process of producing substantially color stable motor fuel from heavy hydrocarbons, which comprises subjecting said hydrocarbons to heat and pressure, removing from the evolved vapor hydrocarbons lying outside the gasoline boiling range, passing the remaining vapor while under super-atmospheric pressure through a body of solid adsorptive material thereby polymerizing the constituents of the vapor which tend to discolor on exposure to light and to form deposits, continuously withdrawing polymers from said adsorptive material and from the vicinity of the treating zone, continuously removing the treated vapor from said material and separating it from the polymers, and subsequently condensing said vapor.

14. The process of obtaining motor fuel from cracked hydrocarbons which comprises fractionating the same to remove hydrocarbons of higher boiling point than the gasoline range, passing the fractionated vapor in a downward stream through a body of solid adsorptive catalytic material, thereby polymerizing hydrocarbons which tend to be unstable in the presence of light and to deposit gum, maintaining the adsorptive material at a temperature below the condensation point of such polymers, continuously draining polymers from the adsorptive material with the help of the vapor stream, removing the treated vapor from said adsorptive material, and subsequently collecting and condensing the treated vapor.

In testimony whereof, I have signed my name to this specification.

THOMAS T. GRAY.